United States Patent [19]

Rhine

[11] 4,228,441
[45] Oct. 14, 1980

[54] PRINTER HEAD BIASING APPARATUS

[75] Inventor: Samuel Rhine, Beaumont, Tex.

[73] Assignee: Helena Laboratories Corporation, Beaumont, Tex.

[21] Appl. No.: 10,557

[22] Filed: Feb. 9, 1979

[51] Int. Cl.² .................................................. G01D 15/16
[52] U.S. Cl. ............................. 346/139 C; 346/76 PH
[58] Field of Search ........................ 346/76 PH, 139 C

[56] References Cited

U.S. PATENT DOCUMENTS

| | | | |
|---|---|---|---|
| 3,187,332 | 6/1965 | Barter et al. | 346/139 C |
| 3,312,980 | 4/1967 | Erbach | 346/139 C |
| 3,346,871 | 10/1967 | Fowler | 346/139 C |
| 4,085,407 | 4/1978 | Stratbucker et al. | 346/76 PH X |

*Primary Examiner*—George H. Miller, Jr.
*Attorney, Agent, or Firm*—Cullen, Sloman, Cantor, Grauer, Scott & Rutherford

[57] ABSTRACT

In a chart recorder where a print head is used to record data on a moving strip of chart paper, an improved apparatus for biasing the print head against the moving chart paper. The biasing apparatus provided includes a cantilevered leaf spring to maintain a constant and preset pressure between the print head and the moving chart paper. The distal or fixed end of the leaf spring is anchored to the frame of the chart recorder and the print head is mounted on the free end of the cantilevered leaf spring so that the leaf spring maintains a constant pressure between the print head and the moving chart paper. The cantilevered spring is adjustable to provide the desired amount of pressure between the print head and the moving chart paper. When a new roll of chart paper is inserted into the chart recorder, the cantilever spring re-establishes and maintains the pressure between the print head and the new roll of chart paper.

10 Claims, 3 Drawing Figures

PRINTER HEAD BIASING APPARATUS

BACKGROUND OF THE INVENTION

This invention relates generally to chart recorder systems where a print head is utilized to record data on moving chart paper and, more particularly, to an improved apparatus for maintaining the proper pressure between the print head and the moving chart paper. Chart recorders are, of course, well-known, and one common use of chart recorders is in connection with densitometers of the type disclosed in U.S. Pat. No. 4,005,434 assigned to the Assignee of the present invention.

The data recorded on the moving chart paper may be in various forms such as analog, numeric, and alphanumeric. In addition, there are various techniques for actually "printing" the data on the moving chart paper such as thermal printer heads, which require a thermosensitive chart paper, and ink printing heads. The thermal printing heads, of course, may use either the dot-matrix or line-segment printing technique, both of which are conventional.

One of the basic problems with chart recording devices is the need to maintain constant and predetermined pressure between the printer head or pen head and the moving chart recorder paper. When ink type printing heads or ink pens are used, if the pressure is insufficient to maintain contact between the pen and the chart paper, the output from the pen may skip or may be so light as to be difficult to read. If the pressure is too great, the movement of the chart paper may be impeded or a smudging of the ink on the paper may occur. Furthermore, if the pressure is not constant, the readability of the data on the chart paper will be poor.

Similar problems arise when a line segment or dot-matrix print head is used in conjunction with thermosensitive paper. The basic structure for dot-matrix print heads includes an array or series of separate heat output elements on the print head which are selectively excited by electrical signals transmitted to the print head. When a particular element is excited or heated, the transfer of heat from that element to the chart paper causes a visible darkening of the paper to occur.

Insufficient pressure between the print head and the moving chart paper can create a weak, barely visible darkening, or no darkening at all, while too much pressure may impede the movement of the paper or create a large dark area on the paper.

Therefore, it can be seen that the pressure between the print head and the chart paper is particularly important not only in conjunction with ink pen printers but also in conjunction with dot-matrix print heads.

Prior art treatment of the problem of pressure control between the print head and the chart paper centers around the use of a series of coil springs which are used in various configurations to hold the print head in contact with the paper. Whether the coil springs are located vertically or horizontally between the head and a support frame the same difficulties arise. These difficulties included a wearing out or fatiguing of the coil springs either in part or in total and either individually or as a group due to frequent paper changing. That is, when a roll of chart paper is removed from the recorder, the compression of the coil springs is released, and when a new roll of chart paper is inserted, the coil springs are once again compressed to hold the print head against the chart paper. This constant chart paper changing causes uneven wear or fatigue of the springs, thereby causing a change in the amount of pressure between the chart paper and the print head.

Another problem with the coil spring arrangement of the prior art is the difficulty in adjusting the pressure. That is, there is no convenient manner of adjusting the pressure except by changing the number of coil springs or the strength of each coil spring. This becomes particularly relevant when the chart paper being used is of a different sensitivity than that of the prior chart paper. The pressure between the chart paper and the print head cannot be changed without great difficulty as it requires some adjustment of the individual coils or changes in the structure of the coils.

Yet another structural difficulty with the coil spring arrangements of the prior art is the manner in which the frames upon which the coil springs are mounted interfere with access to the chart recorder and paper. The mounting support structures occupy a significant portion of the open area around the chart paper and print head thereby restricting access to the pens or print heads when adjustment, inspection or replacement of the pens or print head is necessary.

The problems of the prior art print head biasing devices are overcome by the present invention wherein the pressure remains constant over a long period of use and may be adjusted with ease.

SUMMARY OF THE INVENTION

The improved chart recorder print head biasing device of the present invention maintains a constant, specified pressure between the print head and the moving chart paper by using a cantilevered leaf spring having one end anchored to the frame of the chart recorder and the print head mounted on the free end.

In the preferred embodiment, a spring biasing means is located at the anchored end of the leaf spring whereby the pressure between the print head and the chart paper may be adjusted. This adjustment may be accomplished by the use of shims above or below the leaf spring which flex the leaf spring to change the pressure between the print head and the moving chart paper.

When the leaf spring is used in conjunction with a dot-matrix printer and heat sensitive chart paper, where the dot-matrix printer head heats the paper and "burns in" a matrix of symbols to form alpha-numeric characters, the leaf spring provides a constant and adjustable amount of pressure between the printer head and the moving chart paper. The adjustability of the pressure is important in consideration of the different qualities of chart paper which may be used. That is, the heat sensitivity of different rolls of chart paper may be slightly different and the ease with which the pressure on the leaf spring can be adjusted provides a substantial improvement over the prior art pressure control devices.

BRIEF DESCRIPTION OF THE DRAWINGS

The foregoing objects of the present invention, together with other objects and advantages which may be attained by its use, will become more apparent upon reading the following detailed description of the invention taken in conjunction with the drawings.

In the drawings, wherein like reference numerals identify corresponding parts.

DETAILED DESCRIPTION OF THE INVENTION

Figure 1:
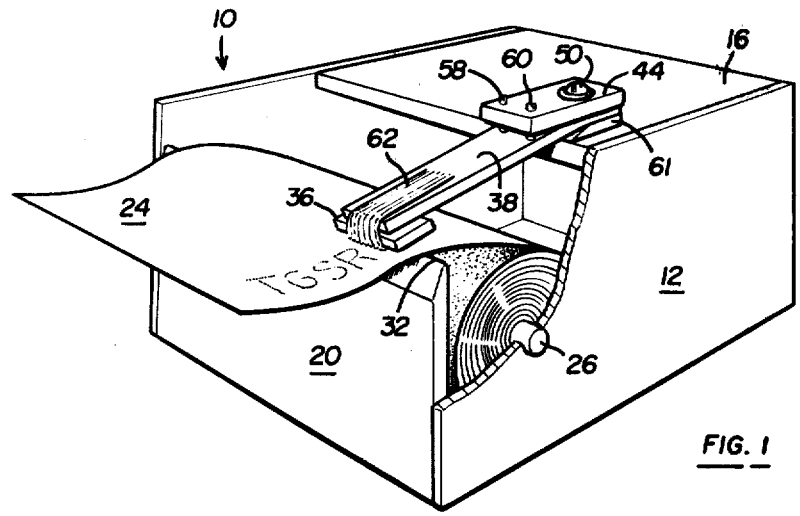
FIG. 1 is a persective view, partly broken away, of a chart recorder including the printer head biasing means of the present invention.
Figure 2:
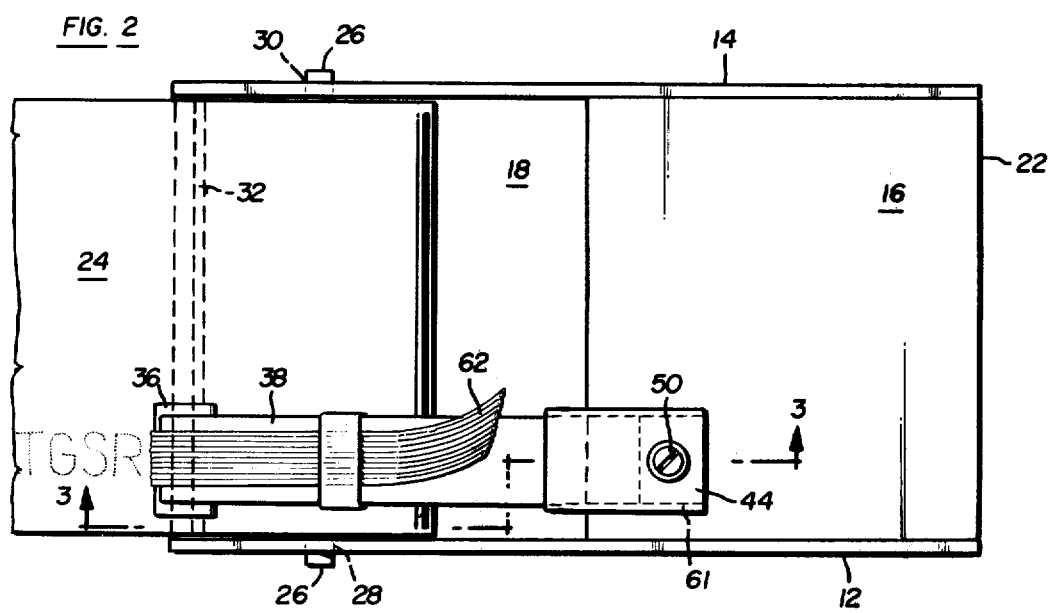
FIG. 2 is a plan view of the printer head biasing apparatus of FIG. 1 illustrating a preferred pressure adjusting means.

Referring now to the drawings, FIG. 1 illustrates a chart recorder 10 including a box-like supporting frame having opposed sides 12 and 14, a top 16, a bottom 18 and ends 20 and 22.

Positioned interiorly of the chart recorder 10 is a roll of chart paper 24 mounted on a spindle 26. The spindle is positioned for rotation within apertures 28 and 30 in the side walls 12 and 14 of the chart recorder. As the chart paper is withdrawn from the roll, the chart paper passes over the top edge 32 of the first end 20 which top edge is referred to as the knife edge. The actual printing is accomplished with the knife edge functioning as a support for the paper.

Thus means 34 is provided for maintaining a print head 36 in contact with the chart paper at the location where the printing occurs, i.e., at the time that the chart paper passes over the knife edge 32.

The means 34 for maintaining the print head in contact with the moving chart paper includes a cantilever leaf spring 38 having a first end 40 anchored to the top 16 of the chart recorder and having its other or free end 42 extending over the knife edge 32 of the chart recorder. The print head 36 is mounted on the free end 42 of the cantilever leaf spring.

Means are provided for anchoring or retaining the leaf spring 38 on the top 16 of the chart recorder box-like support frame. More specifically, a flat generally rectangular retainer 44 is provided having an aperture adjacent one end thereof. The leaf spring 38 is provided with an aperture at the first end 40 thereof and a fastener such as a screw 50 is secured through the aperture in the retainer 44 and then through the aperture in the first end 40 of the leaf spring 38 and finally into the top 16 of the chart recorder support frame. Thus the leaf spring 38, at its first end, is positioned between the top of the support frame and the retainer 44.

Means are also provided for adjusting the pressure between the print head 36 and the moving chart paper 24. One of the advantages of the present invention is that the retainer 44, which serves to anchor the leaf spring to the chart recorder, also serves the function of being part of the means for adjusting the pressure between the print head 36 and the chart paper 24.

More specifically, as illustrated in FIG. 1, adjacent the end of the retainer 44 closest to the knife edge 32 there is provided a plurality of apertures through the retainer 44 which apertures are threaded to receive screws 58, 60, therethrough. The screws 58, 60 may have a generally flat bottom so that the screws bottom out or abut the leaf spring 38 without any substantial penetration of the leaf spring. Thus the screws 58 and 60 do not serve as fasteners in the conventional sense to secure the leaf spring to the retainer 44 but, to the contrary, are provided to flex the leaf spring to thereby adjust the tension between the print head 36, mounted on the free end of the leaf spring, and the moving chart paper 24.

In the preferred embodiment, the pressure adjusting means comprises an elongated, tapered shim 61 having a slot therethrough. The shim 61 is placed between the top 16 of the chart recorder and the leaf spring 38 with the thinner end of the shim 61 positioned toward the print head 36. The screw 50, which secures the retainer 44 and leaf spring to the recorder, also extends through the aperture in the shim 61. By loosening screw 50 and moving shim 61 toward or away from the print head 36, the pressure between the print head 36 and the moving chart paper 24 will be decreased or increased, respectively, and the screw 50 may be tightened to retain the shim 61 in the desired position. Optionally, different shims of different thicknesses may be used.

Figure 3:
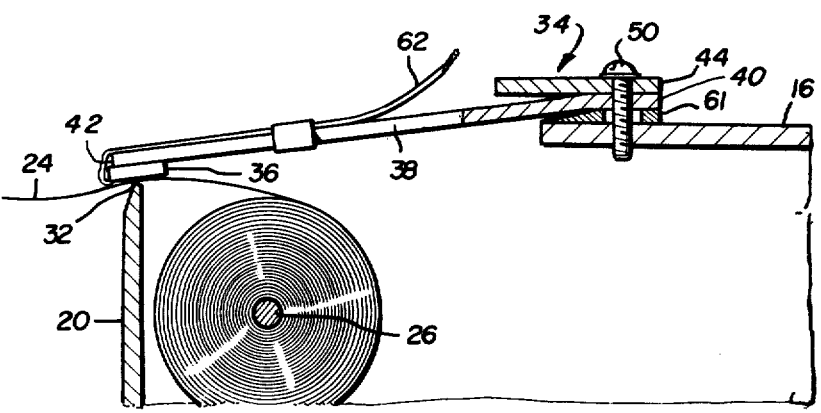
FIG. 3 is a view as seen in the plane of arrows 3—3 of FIG. 2 taken through the printer head biasing apparatus and illustrating the means for adjusting the pressure of the printer head biasing apparatus.

In operation of the chart recorder 10, the adjustment shim 61 is initially set to maintain a desired pressure between the print head 36 and the moving chart paper 24. If the pressure is to be increased or decreased for any one of a variety of reasons, including a different chart paper sensitivity, it is only necessary to advance or withdraw the shim 61. Thus for a darker printing the shim 61 is withdrawn, or moved away from the print head 36 towards the right in FIG. 3 to flex the leaf spring 38 downwardly relative to the knife edge 32 while if the print is too dark, the shim 61 is advanced slightly towards the left in FIG. 3 to decrease the pressure between the print head 36 and the moving chart paper 24.

In the preferred embodiment, the print head 36 is of the dot-matrix type and includes a plurality of wires 62 to the print head 36. On the underside of the print head 36 there is a single line of individually heatable dot-like elements and each wire in the group of wires 62 is connected to a single dot-like element. Upon selectively energizing various sequences of dot-like elements, the data is "printed" by heating the thermo-sensitive paper. The particular type of dot-matrix print head and its associated lead-in electrical wires 62 are conventional.

It is to be understood that various changes and modifications can be made without departing from the spirit and scope of the present invention. The invention, therefore, should be limited only by the following claims.

What is claimed is:

1. In a chart recorder where a print head is used to record data on a moving strip of chart paper, said chart recorder including a support frame and means for supporting the moving chart paper, said moving chart paper supporting means being spaced apart from said print head to accommodate the moving chart paper therebetween, the improvement comprising:

a cantilevered leaf spring having a fixed end provided with an opening and a free end, said fixed end anchored by a retainer means to said support frame;

said print head mounted on the free end of said leaf spring adjacent said paper supporting means;

said leaf spring for biasing the print head for maintaining constant pressure between the print head and the moving chart paper;

said retainer means comprising a plate overlying said fixed end of the leaf spring and having an opening aligned with the opening in said leaf spring; and a threaded fastener extending through said openings into said support frame.

2. The invention as defined in claim 1 wherein means are provided for adjusting the pressure between the print head and the moving chart paper.

3. The invention as defined in claim 1 wherein means are provided for adjusting the pressure between the print head and the moving chart paper, said adjusting means flexing said free end of said leaf spring by applying a force adjacent the fixed end of the leaf spring.

4. The invention as defined in claim 1 wherein said retainer means includes biasing means to adjustably engage the leaf spring to thereby adjust pressure between the print head and the moving chart paper.

5. The invention as defined in claim 4 wherein said biasing means include one or more threaded elements adjustably carried by said plate, the bottom of each threaded element being engageable with said leaf spring.

6. The invention as defined in claim 1 wherein said retainer means includes a shim in contact with said leaf spring for flexing said leaf spring to adjust the pressure between said print head and said moving chart paper; said shim having an opening through which said threaded fastener extends.

7. The invention as defined in claim 6 wherein said shim is located between said support frame and said fixed end of said leaf spring.

8. In a chart recorder where a print head is used to record data on a moving strip of chart paper, said chart recorder including a support frame and means for supporting the moving chart paper, said moving chart paper supporting means being spaced apart from said print head to accommodate the moving chart paper therebetween, the improvement comprising:
   a cantilevered leaf spring having a fixed end and a free end, said fixed end anchored by a retainer means to said support frame;
   said print head mounted on the free end of said leaf spring adjacent said paper supporting means;
   said leaf spring for biasing the print head for maintaining constant pressure between the print head and the moving chart paper;
   said retainer means including means to adjust the pressure between said print head and the moving chart paper.

9. In a chart recorder where a print head is used to record data on a moving strip of chart paper, said chart recorder including a support frame and means for supporting the moving chart paper, said moving chart paper supporting means being spaced apart from said print head to accommodate the moving chart paper therebetween, the improvement comprising:
   a cantilevered leaf spring having a fixed end and a free end, said fixed end anchored by a retainer means to said support frame;
   said print head mounted on the free end of said leaf spring adjacent said paper supporting means;
   said leaf spring for biasing the print head for maintaining constant pressure between the print head and the moving chart paper;
   said retainer means including biasing means to adjustably engage the leaf spring to thereby adjust pressure between said print head and the moving chart paper.

10. In a chart recorder where a print head is used to record data on a moving strip of chart paper, said chart recorder including a support frame and means for supporting the moving chart paper, said moving chart paper supporting means being spaced apart from said print head to accommodate the moving chart paper therebetween, the improvement comprising:
   a cantilevered leaf spring having a fixed end and a free end, said fixed end anchored by a retainer means to said support frame;
   said print head mounted on the free end of said leaf spring adjacent said paper supporting means;
   said leaf spring for biasing the print head for maintaining constant pressure between the print head and the moving chart paper;
   said retainer means including a shim in contact with said leaf spring for flexing said leaf spring to adjust the pressure between said print head and the moving chart paper.

* * * * *